United States Patent [19]

Mahany

[11] Patent Number: 5,546,397
[45] Date of Patent: Aug. 13, 1996

[54] HIGH RELIABILITY ACCESS POINT FOR WIRELESS LOCAL AREA NETWORK

[75] Inventor: Ronald L. Mahany, Cedar Rapids, Iowa

[73] Assignee: Norand Corporation, Cedar Rapids, Iowa

[21] Appl. No.: 238,180

[22] Filed: May 4, 1994

Related U.S. Application Data

[63] Continuation-in-part of Ser. No. 197,392, Feb. 16, 1994, abandoned, which is a continuation-in-part of Ser. No. 170,121, Dec. 20, 1993, abandoned.

[51] Int. Cl.$^6$ ............................................. H04B 7/04
[52] U.S. Cl. .................. 370/85.1; 375/347; 455/52.1; 455/101; 455/133; 455/272
[58] Field of Search .................. 455/52.1, 52.2, 455/53.1, 54.1, 56.1, 101, 103, 132, 133, 271, 277.1, 277.2; 370/18, 26, 37, 85.1, 85.3, 95.1, 95.3; 371/68.2; 375/260, 285, 347; 359/113, 152, 164, 167

[56] References Cited

U.S. PATENT DOCUMENTS

| | | | |
|---|---|---|---|
| 5,097,484 | 3/1992 | Akaiwa | 455/101 |
| 5,164,942 | 11/1992 | Kamerman et al. | 455/277.1 |
| 5,181,200 | 1/1993 | Harrison | 455/54.2 |
| 5,268,933 | 12/1993 | Averbuch | 455/101 |
| 5,321,542 | 6/1994 | Freitas et al. | 359/152 |
| 5,390,166 | 2/1995 | Rohani | 370/95.3 |
| 5,410,740 | 4/1995 | Hagström | 455/54.1 |
| 5,410,752 | 4/1995 | Scholefield | 455/54.1 |
| 5,465,392 | 11/1995 | Baptist et al. | 455/55.2 |

*Primary Examiner*—Benedict V. Safourek
*Attorney, Agent, or Firm*—Henderson & Sturm

[57] ABSTRACT

A high reliability access point for RF communications in a wireless local area network. The high reliability access point includes a central processing unit (CPU) for handling high level protocol functions and for interfacing with the infrastructure of the local area network. The high reliability access point also includes at least two wireless adapters. Each wireless adapter includes a radio, a media access control (MAC) processor for handling low level protocol functions, and at least one antenna. The multiple wireless adapters allow the access point to perform self monitoring, reduce the effects of multipath interference, reduce some occurrences of collisions at the access point and provide infrastructure backup in the event of an infrastructure failure. The access points also allow for wireless network infrastructure communication for connection of one or more remote access points to the infrastructure. A backup power supply for the access point is also shown.

21 Claims, 5 Drawing Sheets

HIGH RELIABILITY ACCESS POINT FOR WIRELESS LOCAL AREA NETWORK

CROSS REFERENCE TO RELATED APPLICATIONS (Claiming Benefit Under 35 U.S.C. 120)

This application is a continuation-in-part of U.S. application Ser. No. 08/197,392, filed Feb. 16, 1994, by R. Mahany (Attorney Docket No. DN 38050A) which is in turn a continuation-in-part of U.S. application Ser. No. 08/170,121, filed Dec. 20, 1993, by R. Mahany (Attorney Docket No. DN 38050), both abandoned.

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to access points used in wireless local area networks and more specifically to a highly reliable access point which uses redundant wireless adapters.

BACKGROUND OF THE INVENTION

Wireless local area networks (WLAN's) use radio frequency transmissions to communicate between roaming computer devices and access points (or base stations). These access points are connected to an infrastructure which electronically connect all of the access points to a host system. The infrastructure and the access points make up the information distribution network.

DISCLOSURE OF THE INVENTION

The present invention relates generally to access points used in wireless local area networks and more specifically to a highly reliable access point which uses redundant wireless adapters. An access point built in accordance with the present invention includes at least two wireless adapters. Each wireless adapter includes a radio portion and a low level communication protocol processor. The low level processor could be a MAC (media access control) processor implementing a portion of the data link layer with the ISO protocol model. The access point also includes a Central Processing Unit (CPU) which controls all of the higher level communication protocol as well as controlling the interface between the access point and the infrastructure (the LAN).

The use of multiple wireless adapters allows for the access point to increase its reliability as well as the reliability of the entire distribution network in several ways. One way to increase reliability is to have all of the radios in an access point operating on the same channel simultaneously. This creates an antenna diversity scheme which helps eliminate the negative effects associated with multipath interference problems since each wireless adapter has its own antenna. The antennas of the adapter must be positioned apart from each other a minimum distance of at least one-fourth wavelength. The multiple listening strategy also helps to reduces the number of collisions which occur at the access point when multiple roaming computer devices concurrently attempt to communicate with the access point.

Another way to improve reliability is to have one wireless adapter within the access point monitor the transmission of another wireless adapter thereby creating a Local Loop Back. This provides a means for determining if a particular wireless adapter is working properly. If it is not, the Central Processing Unit can disable the malfunctioning wireless adapter and use only the properly functioning wireless adapters.

Increased reliability is also achieved when there is a break in the infrastructure between access points. In this case, an access point which is no longer connected to the host via the infrastructure can establish communication with an access point that is still connected to the host side infrastructure by having each access point dedicate one of their wireless adapters to infrastructure communication. This technique can also be employed to establish temporary or remote access points in a distribution network without use of a wired infrastructure.

In order to accomplish the strategies described above, the central processing unit of the access point can designate and change the addresses of the wireless adapters. Thus the CPU can set the wireless adapters to all be responsive to the same address or set each wireless adapter to be responsive to different address.

An access point of the present invention could include a back-up power supply to provide power for the access point when the externally supplied power to the access point is interrupted.

An object of the present invention is to provide a high reliability access point for a wireless local area network.

Another object of the present invention is to provide a high reliability access point which utilizes multiple wireless adapters and a central processing unit.

A further object of the present invention is to provide a high reliability access point with wireless adapters which includes low level processing capabilities.

Another object of the present invention is to provide a high reliability access point which utilizes a multiple listening scheme to reduce the negative effects of multipath interference.

Still another object of the present invention is to provide a high reliability access point which utilizes multiple wireless adapters to implement a local loop back listening scheme.

Other objects, advantages, and novel features of the present invention will become apparent from the following detailed description of the invention when considered in conjunction with the accompanying drawings.

BEST MODES FOR CARRYING OUT THE INVENTION

Figure 1:
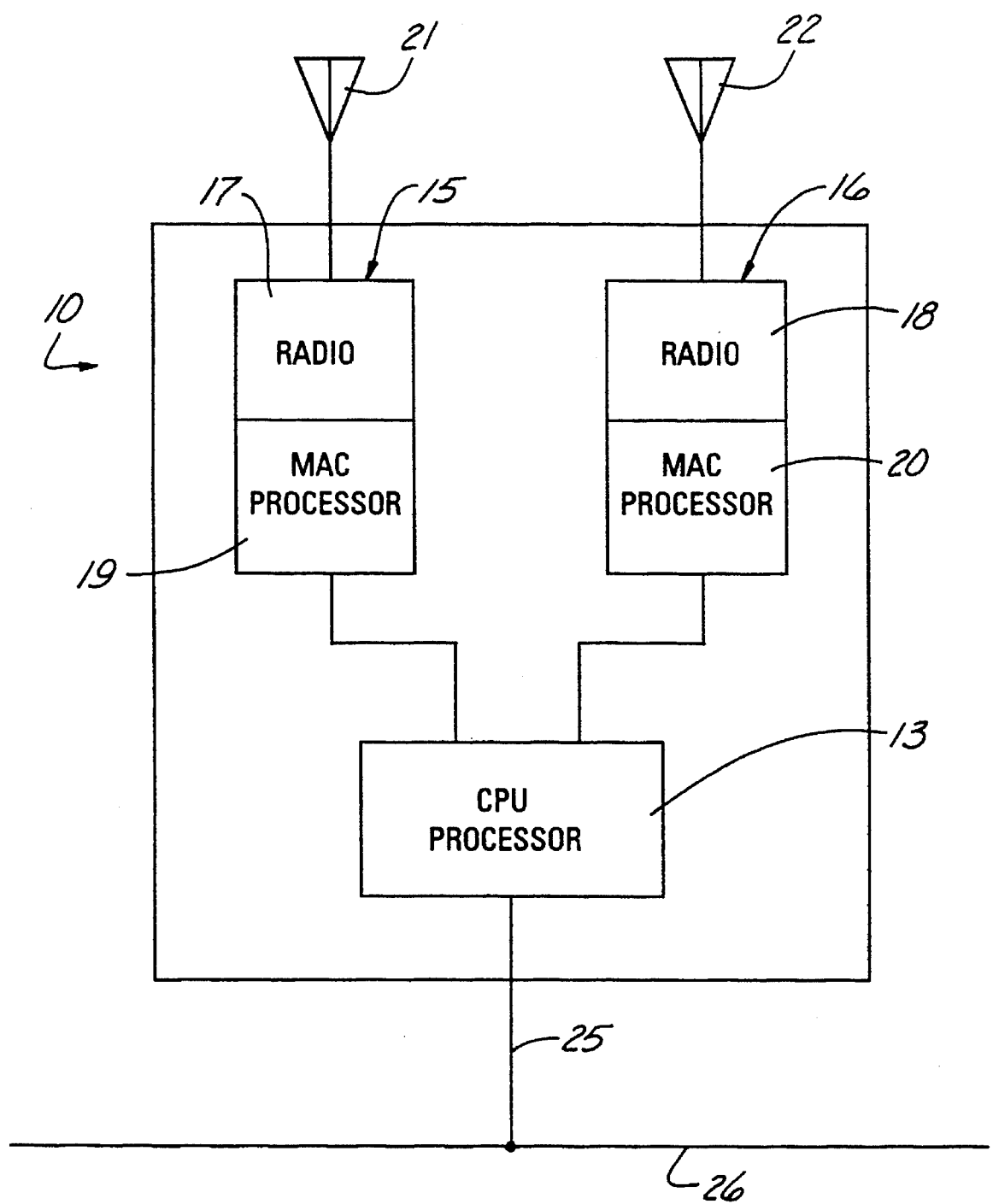
FIG. 1 is a schematic representation of a high reliability access point built in accordance with the present invention.

Referring now to the drawings wherein like reference numerals designate identical or corresponding parts throughout the several views, FIG. 1 shows a high reliability access point (10) built in accordance with the present invention. An access point is a base station on a wireless local area network with which roaming portable or mobile computer devices can connect and communicate. The access point is typically part of an overall distribution network which is connected to a host computer or entire computer local area network (LAN). The access points and the infrastructure make up the distribution network and allow for communications between the roaming computer devices and the host computer or entire computer local area network (LAN).

A high reliability access point (10) of the present invention includes a central processing unit (CPU) processor (13) and at least two wireless adapters (15 and 16). Each of the wireless adapters (15 and 16) include a radio (17 and 18), a media access control (MAC) processor (19 and 20) and an antenna (21 and 22), respectively. The radios and antennas are used for RF transmission and reception. The MAC processor controls low level protocol functions including controlling the operation of the radio, radio channel, error control, e.g. ARQ or Selective Response, and communication with the CPU processor (13). The CPU processor (13) controls the high level communications protocol functions and controls the interface (25) between the high reliability access point (10) and the infrastructure (26). In a preferred embodiment there is a PCMCIA standard interface between the wireless adapters and the access point.

The distribution network is comprised of all of the access points and the infrastructure which connects all of the access points. A host computer or an entire host network is connected to the distribution network. The distribution network allows computer devices roaming within the range of the distribution network to communicate with the host computer or host network.

The division between what is high level protocol, and thus handled by the CPU processor, and what is low level protocol, and thus handled by the MAC processor, can vary greatly depending upon the intelligence level of the MAC processor. In a preferred embodiment, the infrastructure conforms to an industry standard wired LAN such as Ethernet. The MAC processor can be made very intelligent and therefor capable of handling a great deal of radio specific protocol. On the other hand, the MAC processor can be minimally intelligent and handle only the most basic protocol functions allowing the CPU processor to handle the majority of the protocol functions.

Utilizing multiple wireless adapters in a single access point, as well as incorporating independent intelligence and low level protocol responsibility into each wireless adapter, yields several significant advantages. The examples depicted in FIGS. 1–4 show access points using only two wireless adapters per access point. Utilizing two wireless adapters in the manner discussed below will greatly increase the reliability of a particular access point as well as increase the reliability of the entire distribution network. Access points could use more than two wireless adapters and the utilization of the multiple wireless adapters would be similar to the implementation described using only two wireless adapters with addition protocol being required to handle the increased redundancy and to allow for more sophisticated self monitoring.

Referring still to FIG. 1, the CPU processor (13) can designate the RF address to which each wireless adapter (15 and 16) is to respond. The CPU processor (13) can, but need not, assign the same address to each wireless adapter. Therefore, in one configuration, the CPU processor (13) can designate that each of the wireless adapters (15 and 16) respond to the address assign to that access point (10). Designated as such, both radios (17 and 18) will be operating simultaneously on the same channel. In a frequency hopping system, both radios (17 and 18) would be operating on the same hopping sequence and be mutually synchronized to that hopping sequence.

Accordingly, when a roaming computer device within the range of the access point (10) attempts to communicate with the access point (10), both of the wireless adapters (15 and 16) are configured to receive the incoming transmission. As both wireless adapters (15 and 16) receive the transmission, each adapter can evaluate the quality of the of the signal it is receiving. Each adapter provides the received message and quality information to the CPU processor (13) The CPU processor (13) uses the quality information to determine which wireless adapter is receiving the higher quality signal. The CPU processor (13) will then typically choose to receive the incoming transmission on the wireless adapter with the higher signal quality and respond using the same adapter.

The antennas (21 and 22) can be position to allow the access point (10) to implement an antenna diversity scheme which will help reduce the negative effects caused by the interference associated with multipath reception. Antenna diversity can be accomplished in one of two ways. The antennas can either be places sufficiently far apart, typically greater than a quarter wavelength apart, or the antennas can be positioned at a 90 degree angle with respect to each other to create a polarization antenna diversity scheme.

With an antenna diversity scheme in place, the signal from a roaming computer device will be received differently on each antenna due to multipath signal propagation. Therefore, each wireless adapter may receive a signal of a different quality. The CPU processor (13) can choose which wireless adapter to use based upon the quality of the received signal. Each wireless adapter includes the capability of measuring signal quality and only good messages will be forwarded on to the CPU processor (13). The quality can be appended to the message or can be presented to the CPU in a memory register.

Figure 2:
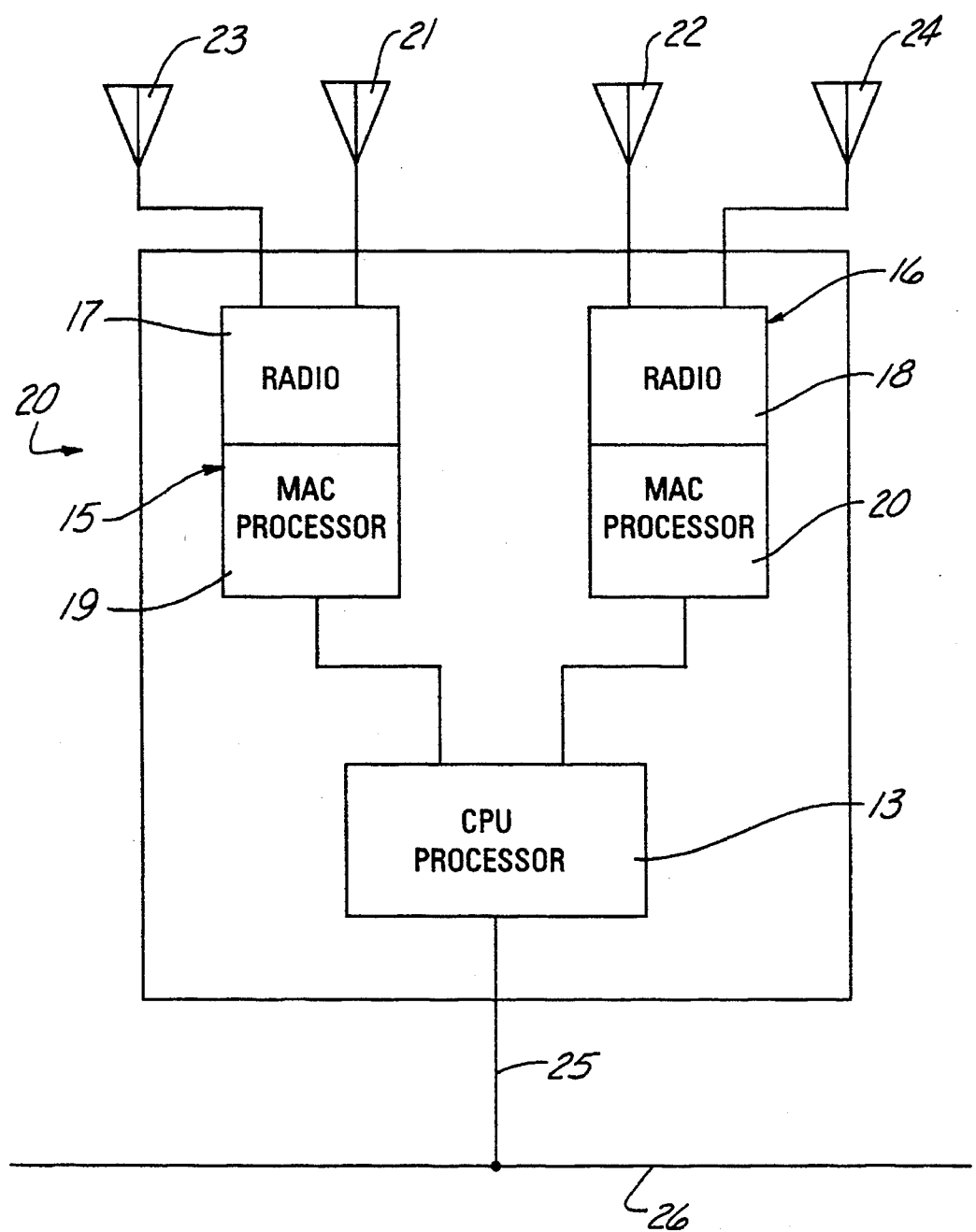
FIG. 2 is a schematic representation of another high reliability access point of the present invention utilizing an antenna diversity scheme at each wireless adapter.

Referring now to FIG. 2, another high reliability access point (20) built in accordance with the present invention is shown. In this embodiment, in addition to having an antenna diversity scheme at the access point level, there is an antenna diversity scheme at the wireless adapter level. Each wireless adapter (15 and 16) includes at least two antennas (21 and 23, 22 and 24, respectively) positioned to create an antenna diversity scheme. Thus for the wireless adapter (15) the antennas (21 and 23) are either positioned sufficiently far apart, more than a quarter wavelength, or the antennas (21 and 23) are positioned in an asymmetrical or orthogonal manner to provide polarization diversity. The antennas (22 and 24) for the wireless adapter (26) are placed in a similar manner.

In this embodiment, an incoming signal is received on both antennas (21 and 23) of the wireless adapter (15). The MAC processor (19) then determines the quality of the signal coming in on each of the antennas (21 and 23) connected to the wireless adapter (15). Based upon the signal quality information, the MAC processor (19) will choose which of the antennas (21 and 23) to use to receive the incoming transmission. The MAC processor will also forward the signal quality information regarding the selected antenna to the CPU processor (13). The wireless adapter (16) will perform a similar process and forward the signal quality information for its best antenna to the CPU processor (13). The CPU processor (13) can then determine which wireless adapter is receiving the highest quality signal and use that wireless adapter to receive the incoming transmission and respond to the transmitting station.

When a high reliability access point wishes to transmit a message, such as an acknowledgement of a received message, to a roaming computer device, the CPU processor (13) will utilize the received quality signal information to determine which wireless adapter to use to send the message. Likewise, if the wireless adapter is utilizing an antenna diversity scheme it will also select the most appropriate antenna for transmitting a message.

While one of the wireless adapters is transmitting, the other wireless adapter can operate as a promiscuous listener to determine if the correct message is being sent. For example, referring to FIG. 1, if the CPU processor (13) is sending a message to a roaming computer device via wireless adapter (16), wireless adapter (17) can operate in the receive mode and monitor the message being sent by the wireless adapter (16). This provides a local loop back capability and allows the access point to perform self monitoring. If the CPU processor (13) determines that one of the wireless adapters is not operating correctly, the malfunctioning wireless adapter can be disabled. Additionally, the CPU processor (13) can then send a message to the system management portion of the host network via the infrastructure (26) that it has a defective wireless adapter and repairs are needed.

Referring again to the configuration in which each of the wireless adapters are listening on the same channel, another advantage achieved by this configuration is the ability to receive two concurrent messages. In an access point which only contains one adaptor this situation will cause a collision and neither message will be received. In a high reliability access point built in accordance with the present invention, it is possible that the one wireless adapter will be able to receive one of the messages while the other wireless adapter receives the other, due to multipath fading at each of the wireless adapter antennas.

Figure 3:
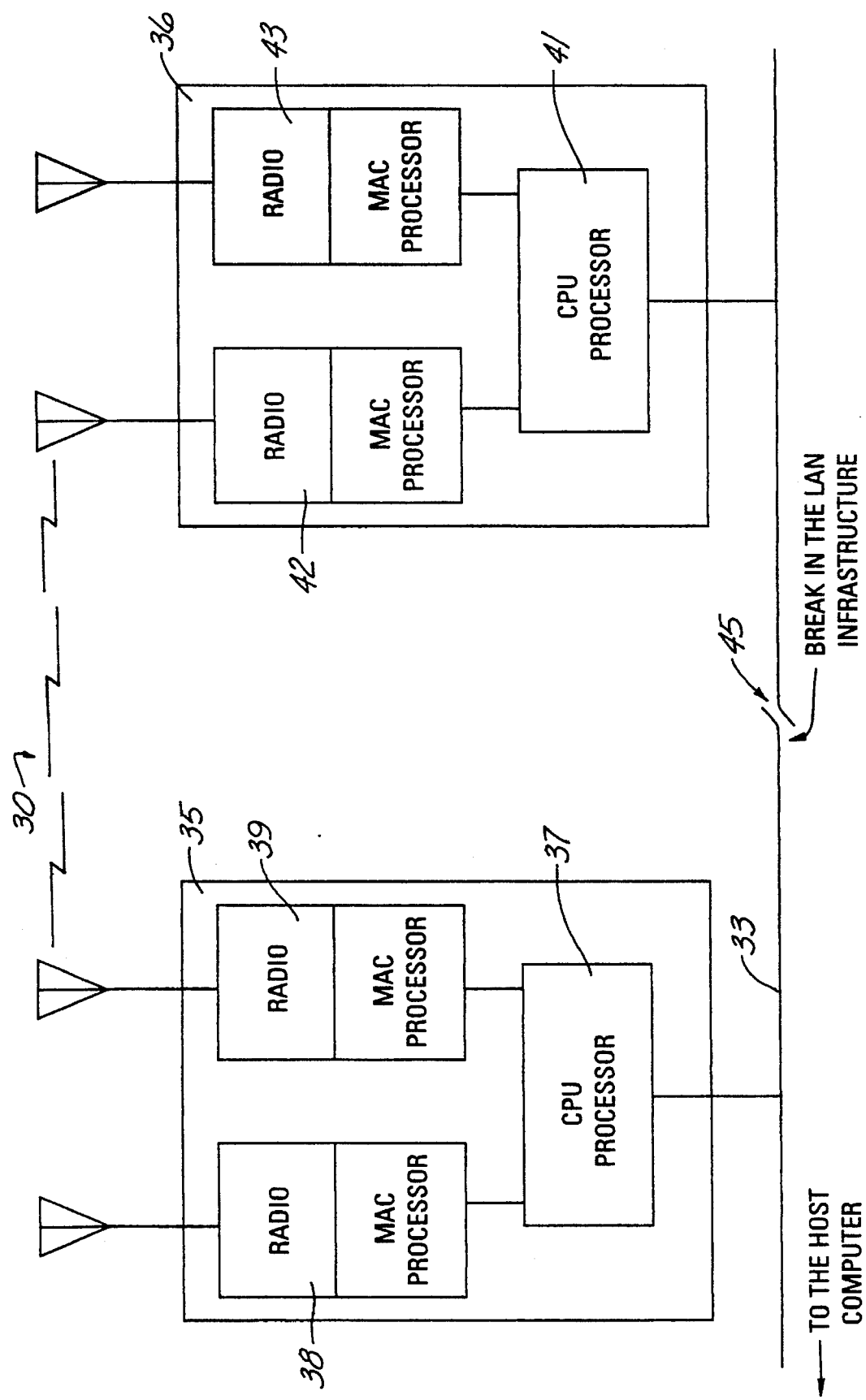
FIG. 3 is a schematic representation of a distribution network for a wireless LAN system utilizing high reliability access points.

Referring now to FIG. 3, a portion of a distribution network (30) utilizing high reliability access points is shown. The distribution network (30) includes an infrastructure (33) and two high reliability access points (35 and 36). Access point (35) includes a CPU processor (37) and two wireless adapters (38 and 39). Access point (36) includes a CPU processor (41) and two wireless adapters (42 and 43). In the present example, a break (45) in the infrastructure (33) has occurred. Access point (35) is upstream to the break with respect to the host computer network and thus is not immediately affected by the break (45). However, access point (36) is downstream to the break (45) and therefore is no longer connected to the host computer network.

When a situation like this occurs, the downstream access point (36) will begin attempting to communicate with an upstream access point using wireless communication. In this example, the upstream access point is access point (35). However, the communication need not be with the access point immediately upstream, the only requirement is that it be with an access point which is upstream with respect to the break. The host computer network or other access points will previously have shared the logistic and address information concerning all of the access points to each access point in the distribution network.

Once communications with an upstream access point (35) is established, each access point (35 and 36) will dedicate one of its wireless adapters (39 and 42, respectively) to provide a wireless repair of the break (45) in the infrastructure (33). When this happens, the CPU processor for each of the access points will instruct the dedicated wireless adapter to change so that it is no longer operating on the same channel as the other adapter in the access point. A communication channel between access points is established. The dedicated wireless adapters (39 and 42) will no longer be used to transmit or receive information to or from roaming computer devices. However, the non dedicated wireless adapters (38 and 43) will continue to communicate with the roaming computer devices. Once the top priority of re-establishing communications between all of the access points in the distribution network (30) and the host computer network has been accomplished, the access points can then send a message to the system management portion of the host computer network detailing where the break (or breaks) exists.

It is conceivable that the distribution network could lose its entire infrastructure. In this case, each of the high reliability access points would dedicate one of its wireless adapters to network infrastructure communications while retaining one of its wireless adapters for communication with roaming computer devices. Using the same technique described above, a temporary or remote access point could be established which is intentionally not connected directly to the infrastructure. This configuration is discussed below in greater detail with reference to FIG. 5. The use of directional gain antennas for the dedicated wireless adapter would allow the temporary or remote access point to be positioned a considerable distance from the infrastructure.

Figure 4:
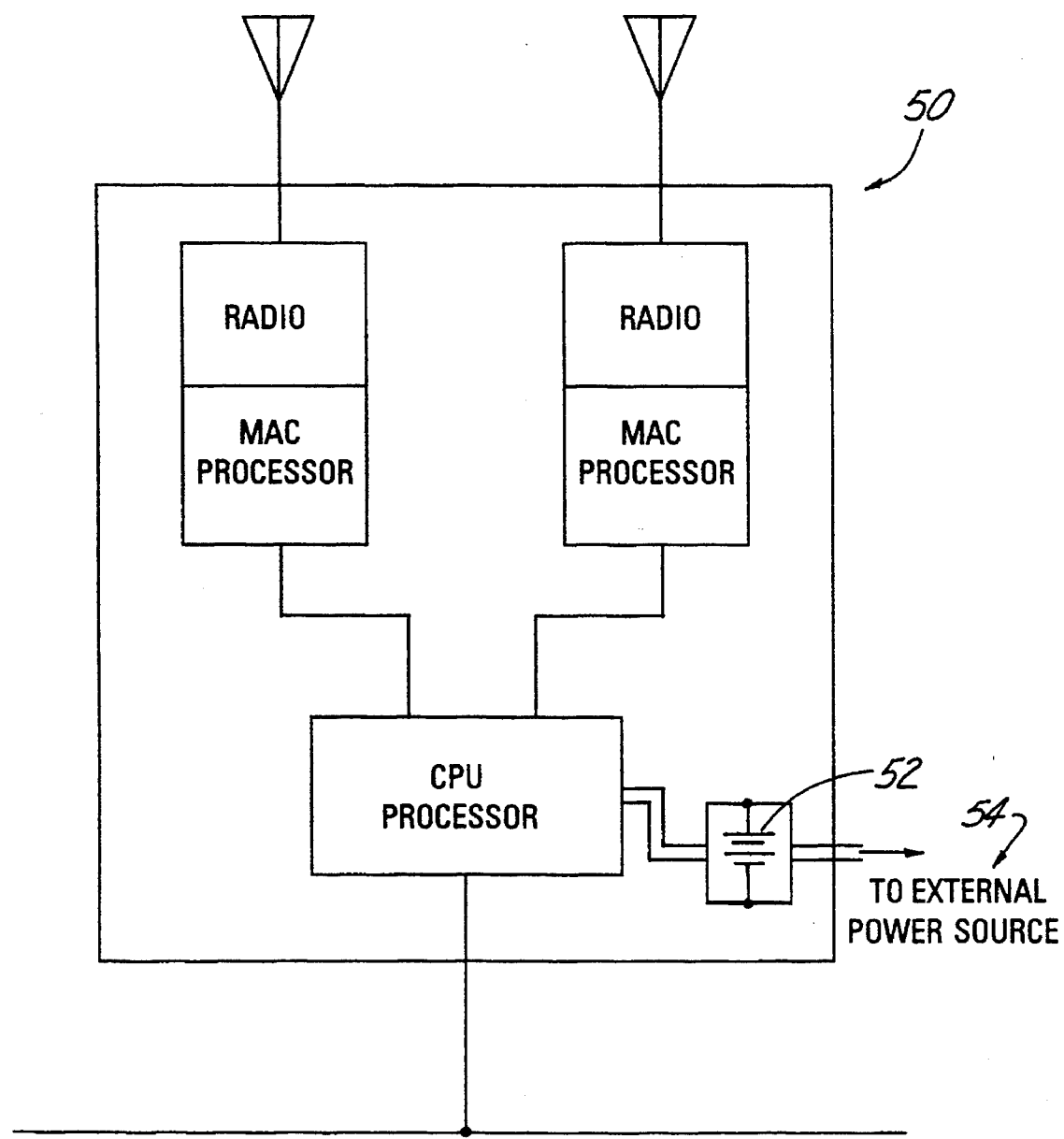
FIG. 4 is a schematic representation of a high reliability access point with a backup power supply.

Referring now to FIG. 4, a high reliability access point (50) with a back up power supply (52) is shown. Typically, the access point will be wired to an external power source (54) such as a wall outlet. However, there is a great desire that if power is lost that the distribution network not shut down since the roaming computer devices will normally not be dependent upon the external power source (54). In this embodiment of the present invention, the back-up power source (52) is wired in parallel with respect to the external power source (54). Thus, if the external power source (54) fails, the access point (50) will not lose power.

Figure 5:
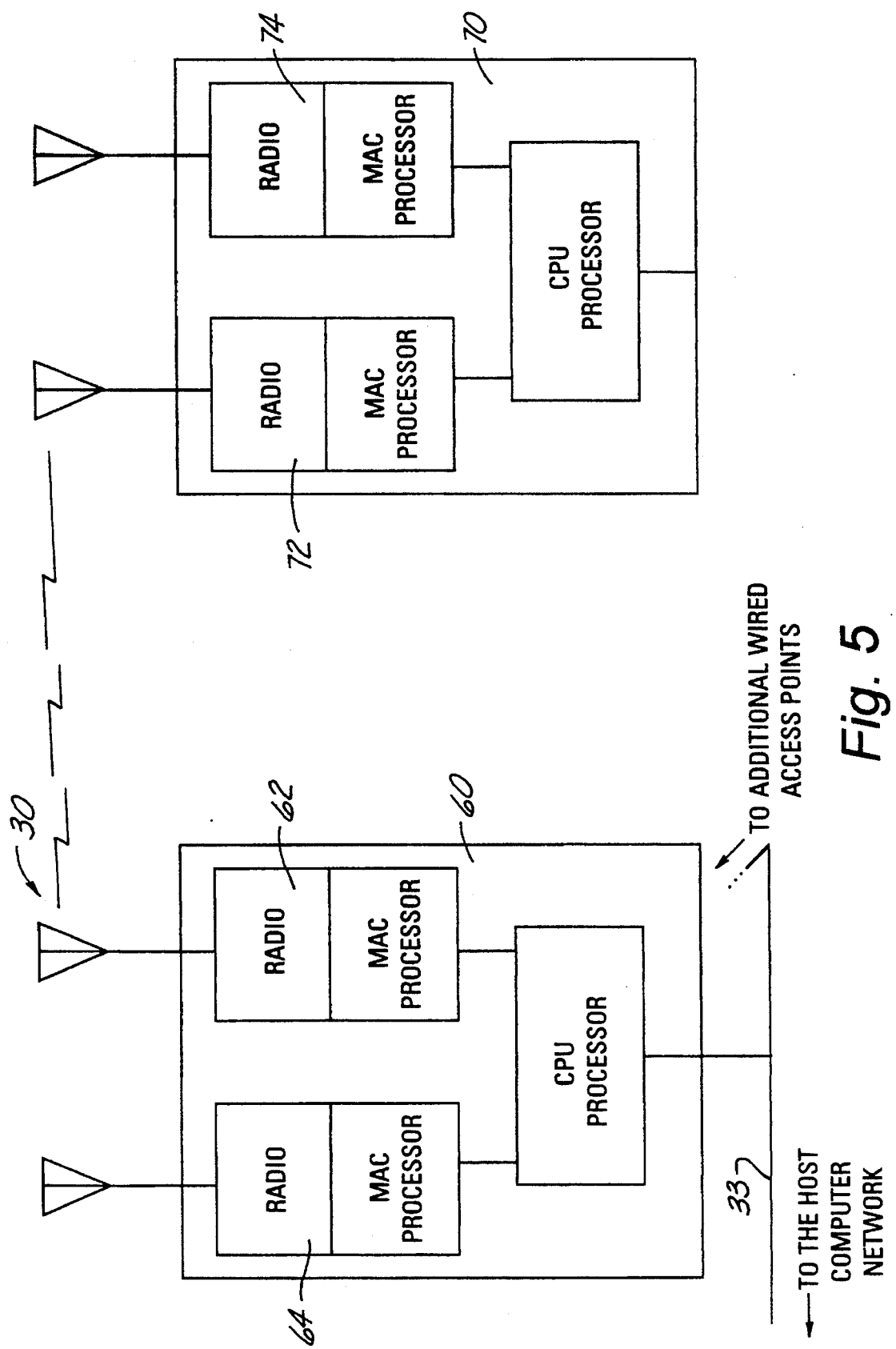
FIG. 5 is a schematic representation of a remote high reliability access point connecting to the distribution network.

Referring now to FIG. 5, a remote access point (70) is shown connecting to the infrastructure (33) by means of dedicated wireless adapters (62 and 72). The access point (70) is not hard wired to the infrastructure (33). Therefore, the access point dedicates one of its wireless adapters (72) to network infrastructure communication. The other wireless adapter (74) continues to communicate with roaming computer devices within the range of the access point (70). An access point (60) which is hard wired into the infrastructure (33) dedicates one of its wireless adapters (62) to network infrastructure communication and establishes a link between the infrastructure (33) and the remote access point (70). The access point (60) can continue to service the roaming computer devices within its range through the wireless adapter (64).

The hard wired access point (60) which is used to connect the remote access point (70) to the infrastructure need not be the access point which is physically closest to the remote access point (70). Use of directional antenna would allow a remote access point to establish communication with virtually any of the access points which are hard wired to the infrastructure. Additionally, several remote access points could establish wireless infrastructure communication by each dedicating one of their wireless adapters. In this arrangement, only one of the remote access points need be in communication with a wired access point. All other remote access points could establish communication with the host computer network via the one remote access point in communication with a wired access point.

Obviously, many modifications and variations of the present invention are possible in light of the above teachings. It is therefore to be understood that, within the scope of the appended claims, the invention may be practiced otherwise than as specifically described.

I claim:

1. A high reliability access point for use in a wireless local area network, comprising:

at least two wireless adapters wherein each adapter includes an RF radio, control processor means for handling low level protocol for said wireless adapter and antenna means operably connected to said adapter for transceiving radio signals; and central processing unit means operably connected to each of said wireless adapters for controlling high level communication protocol for said high reliability access point.

2. The high reliability access point of claim 1 including:

means operably connected to said central processing means for connecting said high reliability access point to a wired local area network distribution system, said distribution system including a host network; and wherein said central processing unit means includes means for interfacing said central processor unit means with said host network.

3. The high reliability access point of claim 1 wherein said antenna means for at least one of said wireless adapters comprises two antennas providing an antenna diversity function.

4. The high reliability access point of claim 1 wherein said control processor means for said wireless adapters comprises a media access control (MAC) processor.

5. The high reliability access point of claim 3 wherein said control processor means for said wireless adapter with said two antennas includes means for determining which of said two antennas is receiving the better signal.

6. The high reliability access point of claim 1:

wherein said control processor means for each of said wireless adapters includes means for quantifying the signal quality of the signal received on said antenna means;

wherein said control processor means for each of said wireless adapters includes means for transmitting said signal quality information to said central processing unit means; and wherein said central processing unit means includes means for comparing said signal qualities for each of said wireless adapters whereby the central processing unit means can utility the wireless adapter with the best signal.

7. The high reliability access point of claim 2 wherein said central processing unit means includes means for assigning addresses to each of said wireless adapters.

8. The high reliability access point of claim 7 wherein each of said wireless adapters are assigned the same address whereby the wireless adapters operate in a similar and simultaneous manner.

9. The high reliability access point of claim 7 wherein at least two of said wireless adapters are assigned different addresses and operate on different channels or on different frequency hopping sequences.

10. The high reliability access point of claim 8 wherein said central processing unit means includes means for selectively choosing which wireless adapter to receive incoming RF transmission whereby said central processing unit means will select the wireless adapter with the highest quality signal reception.

11. The high reliability access point of claim 10 wherein said central processing unit means includes means for utilizing wireless adaptor selected incoming RF transmission to transmit responsive outgoing RF transmission.

12. The high reliability access point of claim 8 wherein said central processing unit means includes means for using the multiple wireless adapters with the same address to reduce the occurrence of collisions when two or more RF transmissions are received at the access point at the same time.

13. The high reliability access point of claim 9 wherein said central processing unit means includes means for dedicating one of said wireless adapters for communication with another access point.

14. The high reliability access point of claim 13 wherein said central processing unit means includes means for detecting a break in the wired local area network distribution system.

15. The high reliability access point of claim 14 wherein said central processing unit means includes means for indicating to the host network that a break has occurred in the infrastructure.

16. The high reliability access point of claim 1:

wherein said central processing unit means includes means for initiating an RF transmission over one of said wireless adapters; and wherein said central processing unit means includes means for listening to said initiated RF transmission using one of said remaining wireless adapters.

17. The high reliability access point of claim 16:

wherein said central processing unit means includes means for detecting when a wireless adapter is malfunctioning; and wherein said central processing unit means includes means for excluding said malfunctioning wireless adapter from being used.

18. The high reliability access point of claim 17 wherein said central processing unit means includes means for indicating to the host network that a wireless adapter at the access point is malfunctioning.

19. The high reliability access point of claim 8:

wherein two of said wireless adapters receive the same transmitted RF signal;

wherein said central processing unit means includes means for comparing the information received by said two of said wireless adapters; and wherein said central processing unit means includes means for utilizing said compared information to detect when a wireless adapter is receiving information incorrectly.

20. The high reliability access point of claim 19 wherein said central processing unit means includes means for indicating to the system management that a wireless adapter at the access point is malfunctioning.

21. The high reliability access point of claim 2 further including a back-up power source.

* * * * *